A. J. SCHOENBEIN.
AUTOMATIC GEAR SHIFTING MECHANISM.
APPLICATION FILED SEPT. 1, 1916.
1,279,766.
Patented Sept. 24, 1918.
5 SHEETS—SHEET 1.
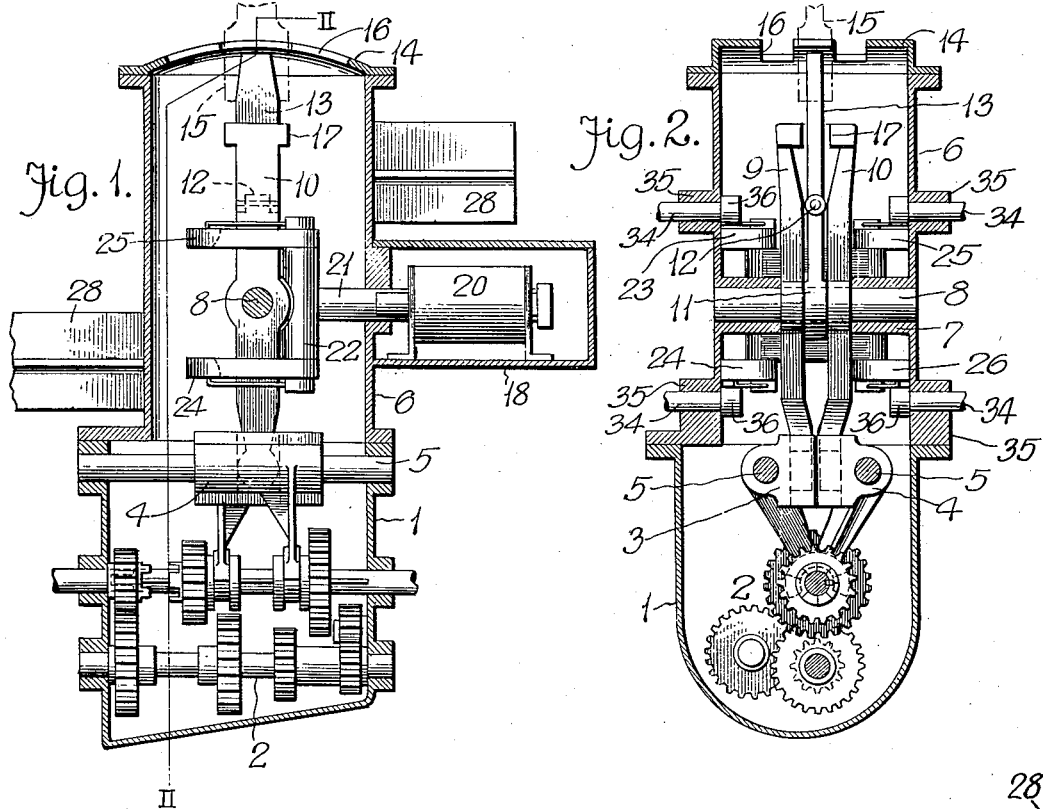
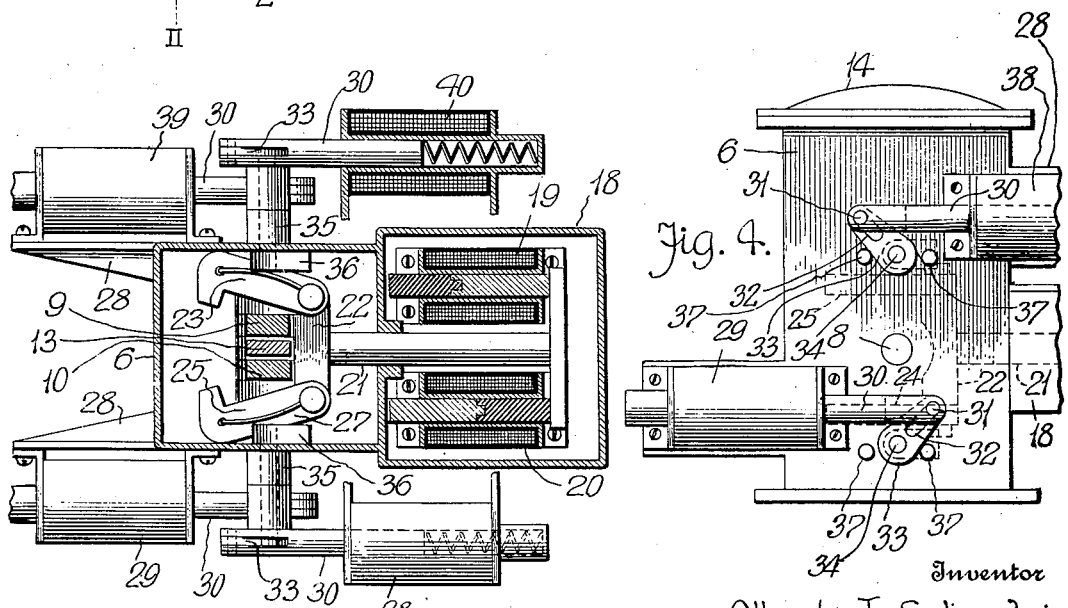
Witness
Chas. W. Stauffer
Karl H. Butler
Inventor
Albert J. Schoenbein,
By
Attorney

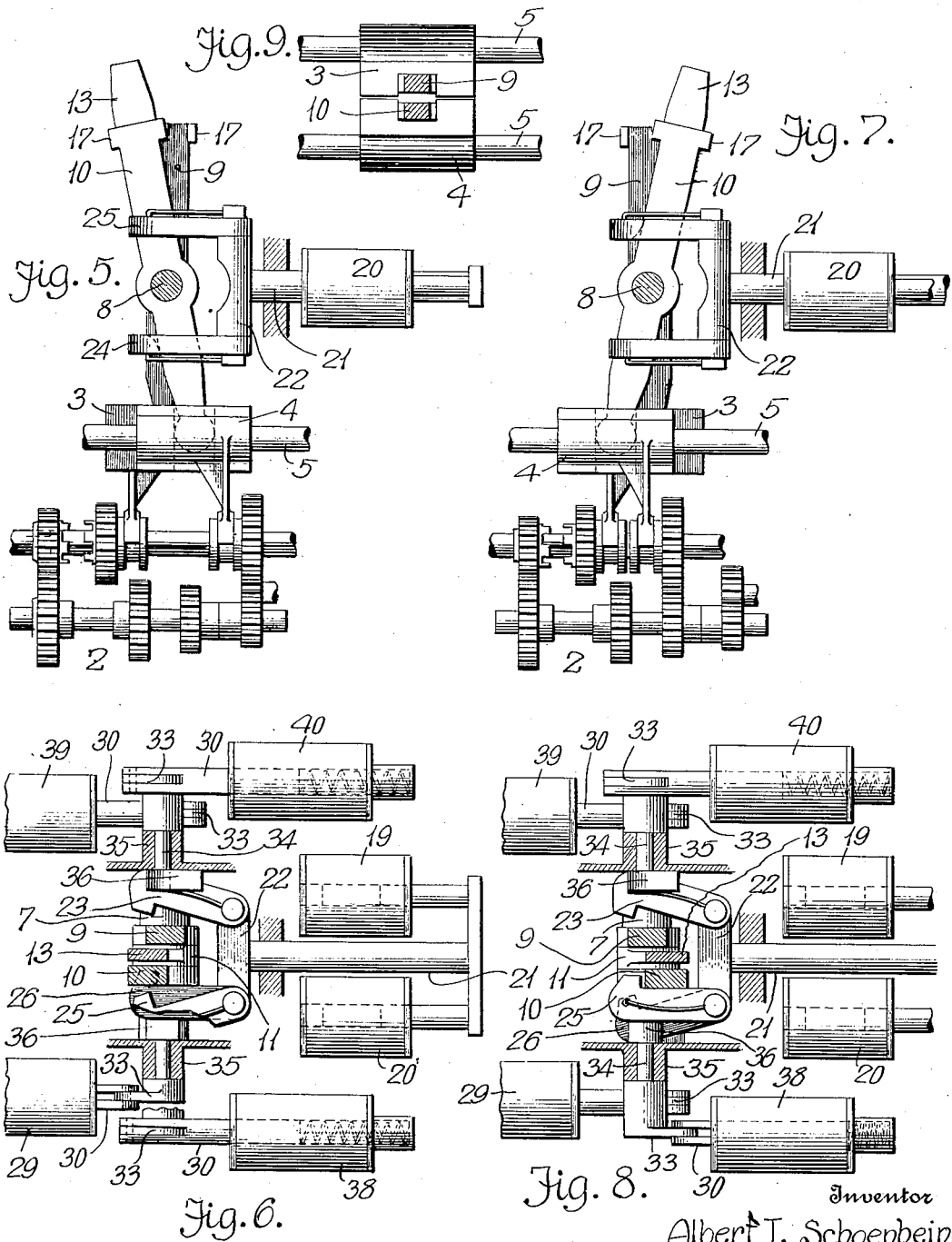

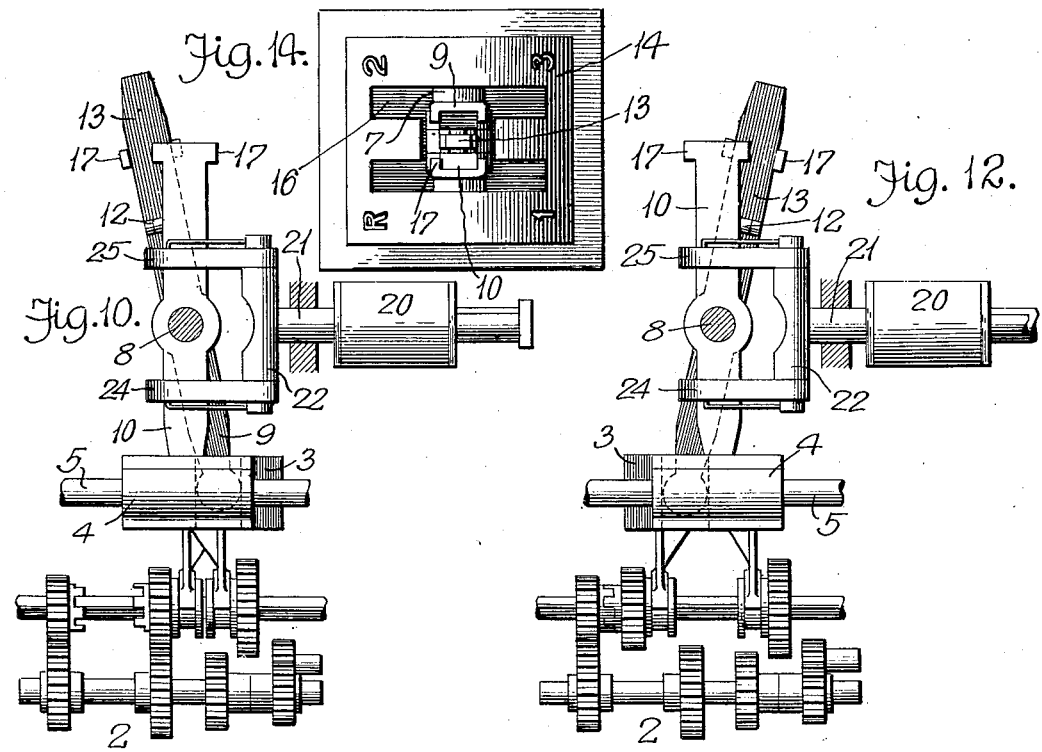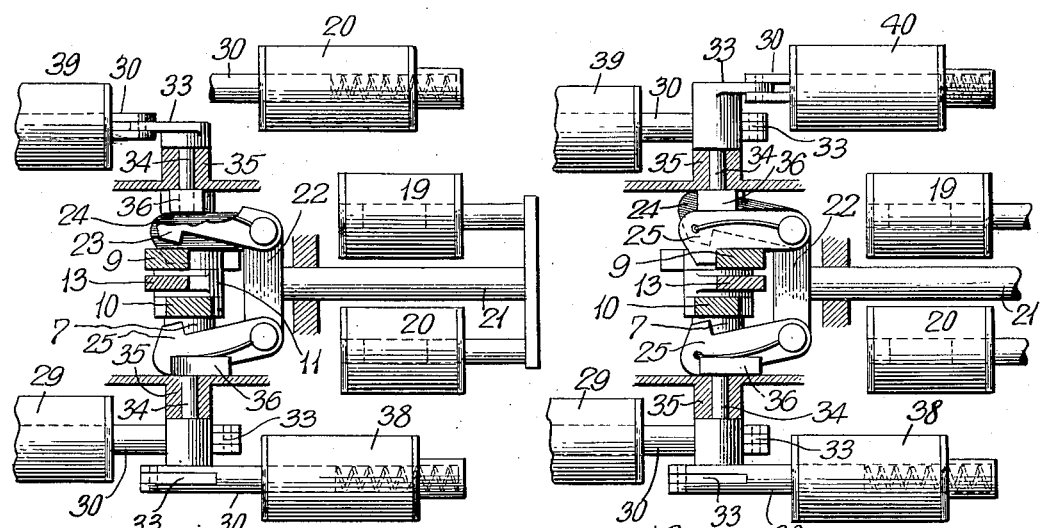

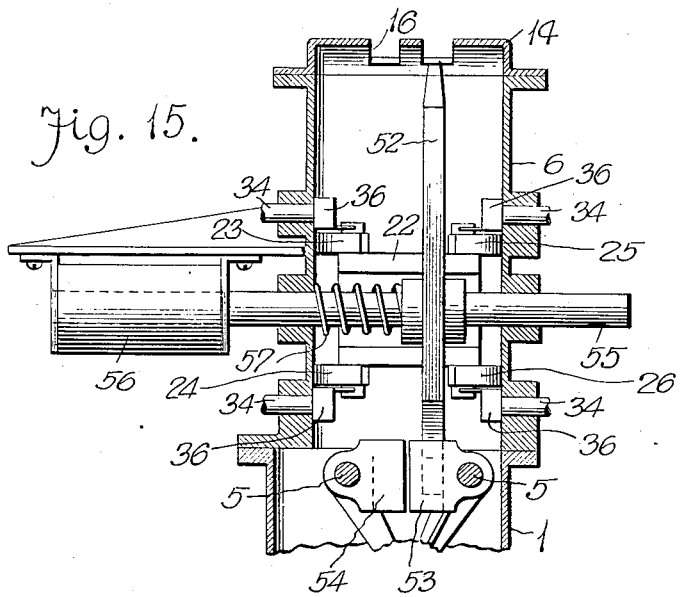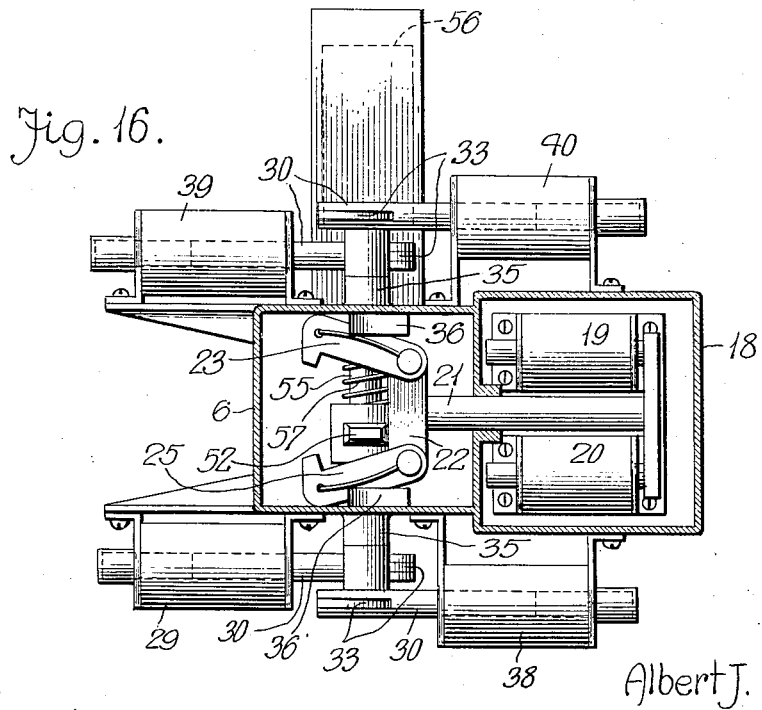

A. J. SCHOENBEIN.
AUTOMATIC GEAR SHIFTING MECHANISM.
APPLICATION FILED SEPT. 1, 1916.

1,279,766.

Patented Sept. 24, 1918.
5 SHEETS—SHEET 5.

Witness
Chas. W. Stauffiger
Karl H. Butler

Inventor
Albert J. Schoenbein
By
Attorney

UNITED STATES PATENT OFFICE.

ALBERT J. SCHOENBEIN, OF FORT WAYNE, INDIANA.

AUTOMATIC GEAR-SHIFTING MECHANISM.

1,279,766.  Specification of Letters Patent.  Patented Sept. 24, 1918.

Application filed September 1, 1916. Serial No. 118,008.

*To all whom it may concern:*

Be it known that I, ALBERT J. SCHOENBEIN, a citizen of the United States of America, residing at Fort Wayne, in the county of Allen and State of Indiana, have invented certain new and useful Improvements in Automatic Gear - Shifting Mechanism, of which the following is a specification, reference being had therein to the accompanying drawings.

This invention relates to an automatic gear shifting mechanism, and more particularly to certain improvements in connection with that type of electrical gear shifting mechanism disclosed by my pending application, filed August 24, 1916, under Serial Number 116705.

In my companion application there is shown a conventional form of change speed gear mechanism having shiftable members adapted to be shifted by a single operating lever. This lever is capable of lateral movement to engage either of the shiftable members and said lever has a set of selector arms which are electrically set so that the operating lever ring be electrically rocked to shift a desired member. The gear shifting mechanism includes a plurality of electrical devices by which desired movements are imparted to the main operating lever, and a novel selector mechanism is employed for controlling and locking certain instrumentalities of the mechanism.

My present invention is characterized by using three operating levers in contradistinction to the single lever shown in my companion application. Of the three operating levers, there is one for each of the shiftable members of the change speed gear mechanism and the third operating lever is interposed between the other two levers and adapted for engagement with either of the levers so that said levers may be manually actuated should occasion require.

My invention is further characterized by actuating operating levers by selector arms normally independent of said operating levers, the selector arms corresponding in number to the reverse, first, second, and third speed positions of the change speed gear mechanism, with an individual electrical device associated with each selector arm.

My invention further resides in certain matters to be hereinafter more fully described and then claimed, and reference will now be had to the drawings wherein—

Figure 1 is a longitudinal sectional view of the automatic gear shifting mechanism showing the same in neutral position;

Fig. 2 is a vertical cross sectional view of the mechanism taken on the line 11—11 of Fig. 1;

Fig. 3 is a plan of a portion of the mechanism in neutral position, showing some of the electrical devices in section;

Fig. 4 is a side elevation of a portion of the mechanism illustrating two of the electrical devices;

Fig. 5 is a side elevation of a portion of the automatic gear shifting mechanism in reverse position;

Fig. 6 is a plan of the same;

Fig. 7 is a side elevation of the automatic gear shifting mechanism in first speed position;

Fig. 8 is a plan of the same;

Fig. 9 is a plan of the shiftable members associated with the change speed gear mechanism;

Fig. 10 is a side elevation of the automatic gear shifting mechanism in second speed position;

Fig. 11 is a plan of the same;

Fig. 12 is a side elevation of the automatic gear shifting mechanism in third speed position;

Fig. 13 is a plan of the same;

Fig. 14 is a plan of an H plate illustrating the relative positions of the automatically and manually operated levers;

Fig. 15 is a cross sectional view of a modified form of gear shifting mechanism;

Fig. 16 is a plan of the same;

Figure 17:
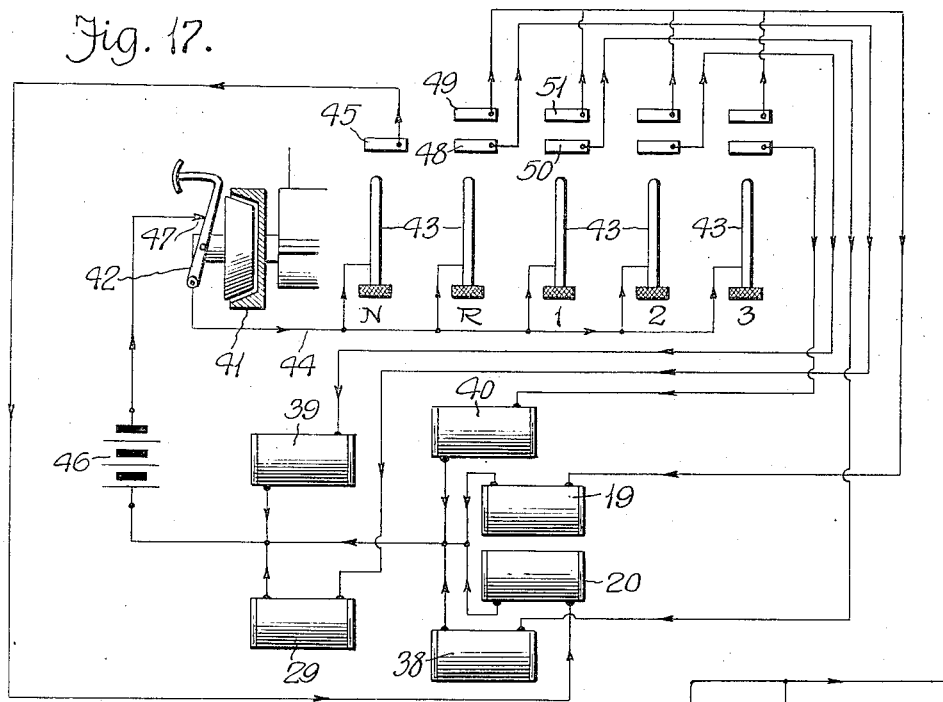
Fig. 17 is a diagrammatic view illustrating the selector mechanism in circuit with the various electrical operating devices of the preferred form of construction, and—
Figure 18:
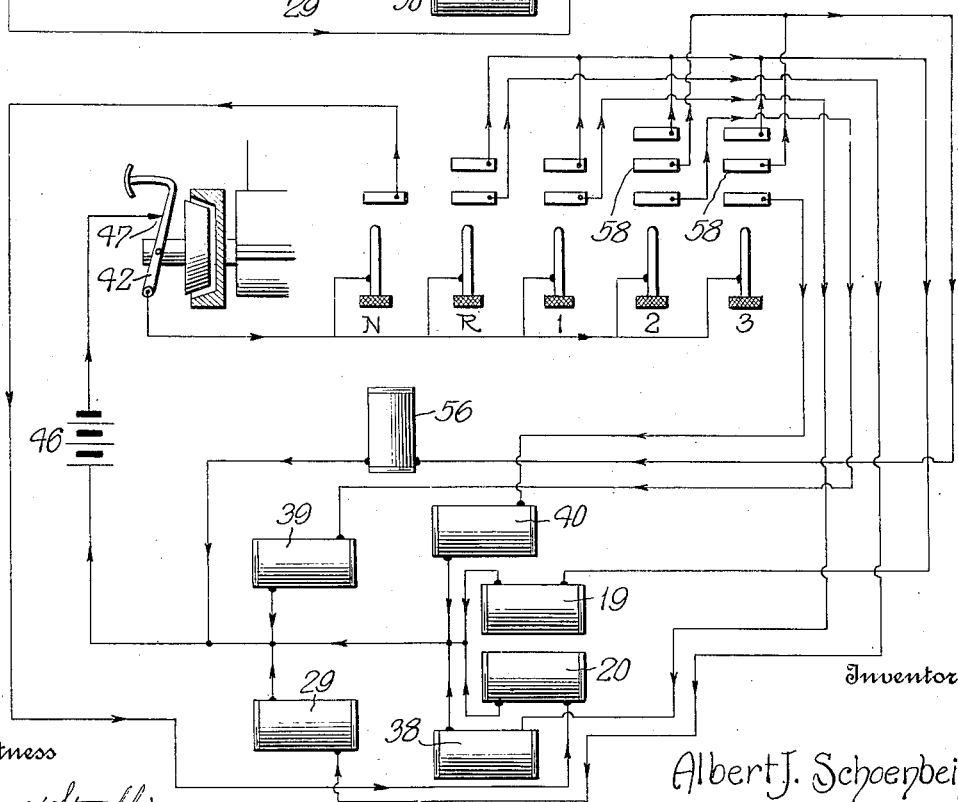
Fig. 18 is a similar view of electrical circuits associated with the modified form of construction shown in Figs. 15 and 16.

In the drawings, 1 denotes a casing containing a conventional form of change speed gear mechanism and for shifting the mechanism to reverse, first, second and third speed positions two shiftable members 3 and 4 are employed, said members being slidable on longitudinal rods 5 within the casing 1 and the confronting faces of said members are recessed.

6 denotes a casing on the casing 1 and the said casing 6 has opposed bearings 7 for a transverse rod 8. Loose on the rod 8, between the bearings 7, are main operating levers 9 and 10 adapted to be oscillated or rocked upon the rod. The lower end of the main operating lever 9 extends into the recess of the shiftable member 3 for moving said member longitudinally of the casing 1 and the lower end of the main operating lever 10 extends into the recess of the shiftable member 4 and is adapted to shift said member.

11 denotes a bearing on the rod 8 between the main operating levers 9 and 10, and pivotally connected to said bearing as at 12, is an intermediate lever 13 adapted to be manually operated. This intermediate lever 13 extends in proximity to an H plate 14 mounted on the casing 6. The H plate 14, as best shown in Fig. 14, has suitable indicia to indicate first, second, third and reverse speed positions and by inserting a suitable handle 15 through the slot 16 of the plate 14 and over the end of the intermediate lever 13, said lever can be swung into engagement with the upper end of either of the main operating levers 9 or 10. The upper ends of the main operating levers 9 and 10 have socket pieces 17 to receive the intermediate lever 13 and thus permit of said lever being manually actuated to shift either of the main operative levers 9 and 10 in a desired direction.

18 denotes a housing carried by the casing 6 and within the housing is a power solenoid 19 and a neutral solenoid 20. The detail construction of these solenoids is disclosed in my companion application and the power solenoid 19 is employed, in conjunction with certain mechanisms to be hereinafter described, to obtain reverse, first, second and third speed positions, while the solenoid 20 is simply employed to restore the mechanisms to normal or neutral position. The cores of the solenoids 19 and 20 are adapted to reciprocate a plunger 21 extending into the casing 6. The inner end of the plunger 21 has a head 22 and pivotally connected to the top and bottom of said head, at the side edges thereof, are sets of selector arms, the arms of one set being designated 23 and 24 and the arms of the other set 25 and 26.

The selector arms are held normally retracted, against the inner walls of the casing 6, by springs 27 and the outer ends of said arms are somewhat hookshaped so that the arms may engage and shift the main operating levers 9 and 10 in desired directions. The arms 23 and 25 are in a plane above the rod 8 and the arms 24 and 26 in a plane below said rod, whereby the arms 23 and 24 may be employed for oscillating the main lever 9 and the arms 25 and 26 for oscillating the main lever 10. The disposition of the selector arms relative to the main operative levers may be best observed in Fig. 2.

28 denotes suitable brackets carried by the casing 6 for electrical devices adapted for setting or shifting the selector arms 23 to 26 inclusive relative to the head 22 of the plunger 21. Attached to one of the brackets is a reverse solenoid 29 and the core 30 of said solenoid has the outer end thereof provided with a pin 31 extending into the slot 32 of a crank 33 and said crank is mounted upon the outer end of a rock shaft 34 journaled in a bearing 35 forming part of the casing 6. The inner end of the rock shaft 34 has a crank 36 and as this crank is adapted to be swung upwardly between the wall of the casing 6 and the selector arm 26, to shift the outer end of the selector arm 26 into position to engage the main operating lever 10, when the power solenoid 19 is energized. The crank 36 has a wedging action between the wall of the casing 6 and the selector arm 26 and the movement of said crank is confined by limiting the movement of the crank 33 by sets of pins 37, carried by the wall of the casing 6. To obtain a reverse position in connection with the change speed gear mechanism, it is therefore apparent that the reverse solenoid 29 must be first energized, then the power solenoid 19, and then the neutral solenoid 20 so that the selector mechanism will be restored to normal position.

38 denotes a first speed solenoid, 39 a second speed solenoid and 40 a third speed solenoid. These solenoids are provided with cores, cranks and rock shafts similar to the reverse solenoid 29. The first speed solenoid 38 is adapted to shift the selector arm 25, the second speed solenoid 39 to shift the selector arm 24, and the third speed solenoid 40 to shift the selector arm 23. It is to be noted that all of the cores of these solenoids are restored to normal position by the expansive force of coiled springs associated with said solenoids, and when the solenoids are deënergized and the cores thereof restored to normal position, the springs 27 do likewise with the selector arms 23 to 26 inclusive. As brought out in my companion application, a good automatic gear shifting mechanism must possess means whereby the mechanism cannot be operated when the clutch of a motor vehicle is thrown in, thereby precluding any possiblity of the gears of the change speed mechanism being stripped or mutilated. In order that the solenoids or electrical devices may be energized or operated in proper order or desired changes in the speed gear mechanism, the circuits of the solenoids include a clutch lever or pedal, a suitable source of electrical energy, and a selector mechanism, all of which has been diagrammatically illustrated in Fig. 17 and reference will now be had to this figure of the drawing.

41 denotes a clutch of the ordinary and well known type used in connection with motor vehicles and the clutch is controlled through the medium of a pivoted pedal or lever 42.

43 generally denotes a plurality of push buttons or operating instrumentalities to be hereinafter referred to as neutral, reverse, first, second and third speed push buttons. All of these buttons are electrically connected, as at 44 to the clutch pedal 42. The neutral button 43, through the medium of a contact 45, is adapted to establish an electrical circuit through the neutral solenoid 20 and this solenoid is in circuit with a suitable source of electrical energy, as batteries 46 and a contact 47 adapted to be engaged by the clutch pedal 42, consequently the clutch pedal must be in a retracted position and the clutch thrown out before a circuit can be established by the neutral button engaging the contact 45.

48 and 49 denote contacts associated with the reverse button, the contact 48 being electrically connected to the reverse solenoid 29 and the contact 49 electrically connected to the power solenoid 19, these solenoids are in circuit with the batteries 46 and the contacts 47 and the circuits through the solenoids are successively established.

50 and 51 denote contacts associated with the first speed push button and the contact 50 is in circuit with the first speed solenoid 38, while the contact 51 is in the circuit with the power solenoid 19. The second and third speed push buttons have contacts in circuits with the second and third speed solenoids and with the power solenoids, and as an instance of operating the automatic gear shifting mechanism, I will recite the changing of the speed gear mechanism to a reverse position and then restoring the mechanism to neutral position.

As heretofore pointed out, no electrical circuit can be established unless the clutch pedal 42 is thrown out or in a retracted position, as shown in Fig. 17, and now assuming that the reverse push button is operated, the button engages the contact 48 and thereby establishes an electrical circuit which will energize the reverse solenoid 29. When this solenoid is energized, the core 30 thereof is extended and through the medium of the crank 33 the shaft 34 is rocked. The crank 36 on the inner end of the shaft 34 is shifted upwardly between the casing 6 and the selector arm 26, forcing said arm inwardly toward the main operating lever 10, whereby the outer hook-shaped end of said selector arm will be in position to engage the lower end of the operating lever 10, when the plunger head 22 is retracted. The reverse push button next engages the contact 49 and establishes an electrical circuit which will energize power solenoid 19. This solenoid retracts the plunger 21 and causes the selector arm 26 to pull upon the lower end of the main operating lever 10, thereby sliding the shiftable member 4 upon its rod 5 and the change speed gear mechanism is thrown in reverse position, as shown in Fig. 5. Fig. 6 clearly shows the selector arm 26 engaging the operating lever 10, with the remaining selector arms in retracted positions.

Before changing the mechanism to first, second, or third speed, it is necessary that the mechanism be brought to a neutral position, and this is accomplished by pressing upon the neutral push button, establish a circuit which will energize the neutral solenoid 20. As the plunger 21 assumes normal position, the head 22 thereof will impinge against the operating lever 10 and swing said lever to a vertical position, as shown in Fig. 1 and with the levers 9 and 10 neutral, either of the speed push buttons may be operated. In connection with these push buttons, it is to be noted that a locking device disclosed in my companion application may be utilized to prevent operation of more than one button at a time.

Reference will now be had to Figs. 15, 16 and 17, showing a modification of my invention, wherein a single main operating lever 52 is used in lieu of the levers 9 and 10, and the main operating lever 52 is arranged very similar to the single operating lever disclosed in my companion application.

The lower end of the lever 52 extends into a shiftable member 53 and is capable of lateral adjustment to engage another shiftable member 54, these two members corresponding to the members 3 and 4 of the preferred form of construction. The single operating lever 52 is pivoted on a reciprocable solenoid core 55 forming part of a solenoid 56, and the lever 52 is held normally in engagement with the shiftable member 53 by a coiled spring 57 on the core 55 of the solenoid. The remaining construction is identical with that previously described, with the exception that the second and third speed push buttons are provided with additional contacts 58 in circuit with the solenoid 56, whereby this solenoid may be energized after the second and third speed solenoids and in advance of energizing the power solenoid. The operation, however, may be somewhat reversed by having the solenoid 56 energized in advance of the second and third speed solenoids, so that the single operating lever 52 will be laterally shifted before a selector arm is placed in position to engage the same when the power solenoid is energized.

Without further reviewing the electrical connections and operation, it is thought that the operation and utility of the automatic gear shifting mechanism will be understood without further description, and while in the drawings there are illustrated the preferred embodiment of my invention, it is to be understood that the structural elements are susceptible to such changes in the size, shape and manner of assemblage, as fall within the scope of the appended claims:—

What I claim is:—

1. In an automatic gear shifting mechanism, levers adapted to be electrically actuated for changing the gears of a change speed mechanism, and a lever between said levers shiftable into engagement with either of said levers for manually changing gears of the change speed mechanism.

2. In an automatic gear shifting mechanism, levers adapted to change the gears of a change speed mechanism, selector arms for each lever, an electrical device for setting each selector arm, and an electrical device for shifting each previously set selector arm to oscillate the lever associated therewith.

3. In an automatic gear shifting mechanism, levers adapted for changing the gears of a change speed mechanism, selector arms for each lever, an electrical device for setting each selector arm, an electrical device for shifting each previously set selector arm to oscillate the lever associated therewith, and an electrical device adapted for restoring the oscillated lever to normal position.

4. In an automatic gear shifting mechanism, pivoted levers adapted for changing the gears of a change speed mechanism, selector arms independent of said levers above and below the pivots of said levers adapted to be set and shifted to move said levers, individual means adapted for setting each selector arm, and means adapted for shifting each arm when set to oscillate the lever in the path of said arm.

5. In an automatic gear shifting mechanism, pivoted levers adapted for changing the gears of a change speed mechanism, selector arms independent of said levers above and below the pivots of said levers adapted to be set and shifted to move said levers, individual means adapted for setting each selector arm, means adapted for shifting each arm when set to oscillate the lever in the path of said arm, and electrical means adapted for restoring the oscillated lever to normal position.

6. In an automatic gear shifting mechanism, pivoted levers adapted for changing the gears of a change speed mechanism, a head adapted to hold said levers normally in neutral position, electrically set selector arms on said head adapted for engagement with said levers, and means adapted to move said head so that a set selector arm shifts the lever in the path of said selector arm.

7. In an automatic gear shifting mechanism, pivoted levers adapted for changing the gears of a change speed mechanism, a head adapted to hold said levers normally in neutral position, electrically set selector arms on said head above and below the pivotal points of said levers adapted for engagement with said levers, and electrical means adapted to move said head so that a set selector arm shifts the lever in the path of said selector arm.

8. In an automatic gear shifting mechanism, pivoted levers adapted for changing the gears of a change speed mechanism, a head normally engaging said levers, selector arms on said head adapted for engagement with said levers, an electrical device for each arm adapted to set the arm for engagement with its lever, and electrical means adapted for shifting said head.

9. In an automatic gear shifting mechanism, pivoted levers adapted for changing the gears of a change speed mechanism, a head normally engaging said levers, selector arms on said head adapted for engagement with said levers, an electrical device for each arm adapted to set the arm for engagement with a lever, electrical means adapted for shifting said head so that an arm moves a lever, and an electrical device adapted for restoring said head and lever to normal position.

10. In an automatic gear shifting mechanism, levers adapted for changing the gears of a change speed mechanism, a set of selector arms for each lever adapted for oscillating the lever, a solenoid for each selector arm adapted to set the arm for engagement with the lever to oscillate the lever in a desired direction, a solenoid adapted to move said arm and lever, and a solenoid adapted to simultaneously restore the last mentioned solenoid and lever to normal position.

11. In a motor vehicle having a clutch pedal, and a change speed gear mechanism; levers adapted for changing the gears of the speed mechanism to reverse, first, second and third speed positions, selector arms for engagement with said levers, a solenoid adapted for setting each selector arm, a solenoid for shifting the selector arms and the lever engaged by a set selector arm, a source of electrical energy for said solenoids and in circuit with said clutch pedal, and a selector mechanism in circuit with said solenoids, said source of electrical energy and said clutch pedal adapted to successively cause solenoids to be energized.

In testimony whereof I affix my signature in presence of two witnesses.

ALBERT J. SCHOENBEIN.

Witnesses:
JOHN WESSEL, Jr.,
PAUL WEHRLE.